UNITED STATES PATENT OFFICE.

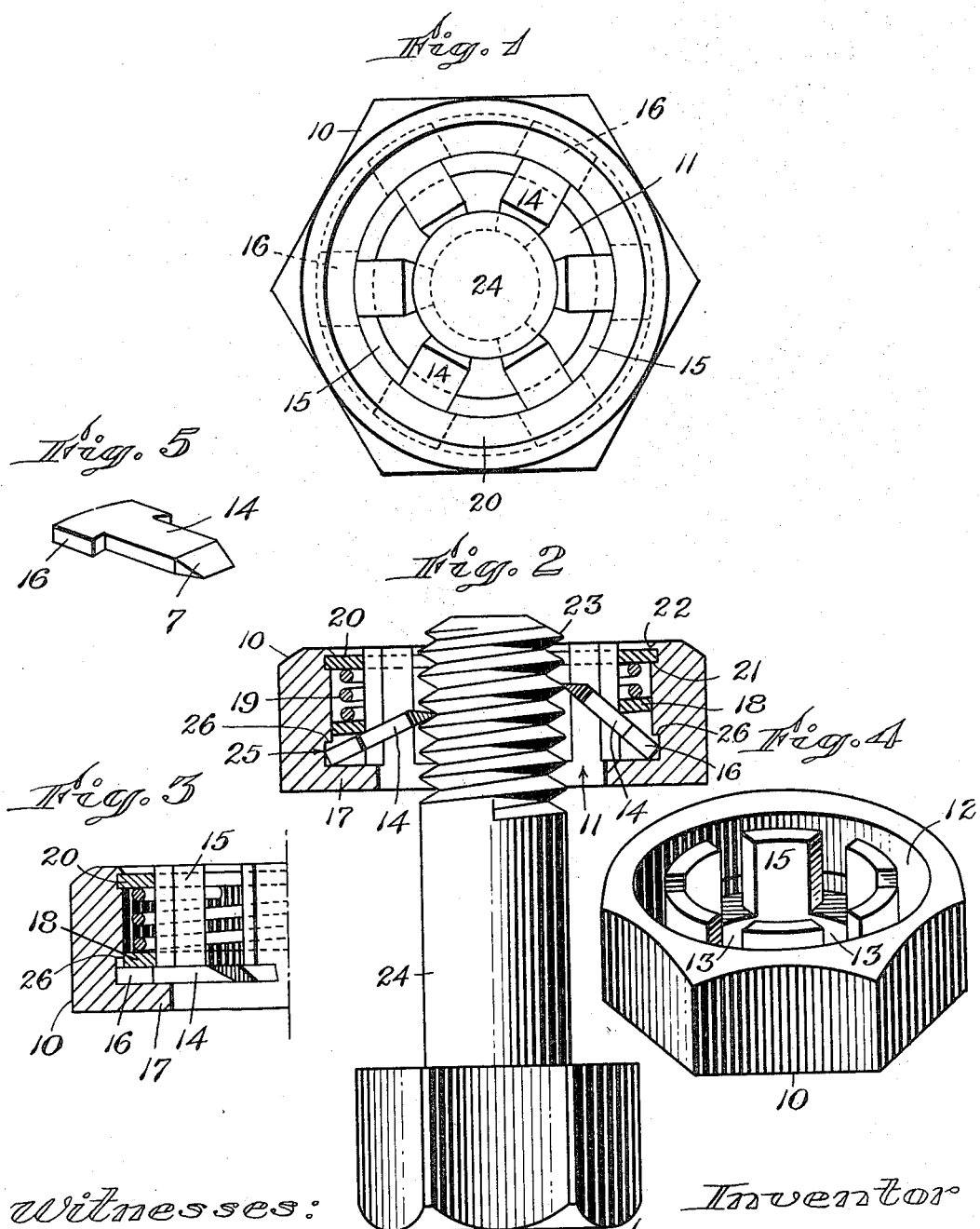

EDGAR L. MARSTON, OF SOMERVILLE, MASSACHUSETTS.

NUT.

1,069,451.  Specification of Letters Patent.  Patented Aug. 5, 1913.

Application filed October 29, 1912. Serial No. 728,331.

*To all whom it may concern:*

Be it known that I, EDGAR L. MARSTON, a citizen of the United States, and resident of Somerville, in the county of Middlesex and State of Massachusetts, have invented certain new and useful Improvements in Nuts, of which the following is a specification.

The object of the present invention is to provide a nut which will coöperate with a threaded shank of any pitch or lead and of any diameter within certain limits.

The characteristic feature of the nut which forms the subject matter of this application is that the thread-engaging element comprises a plurality of relatively movable members similar to pawls which extend inwardly toward each other from the rim of the nut and enter the grooves between the teeth of the male thread. The nut is formed with a central opening which receives the threaded shank, the diameter of this opening being relatively large to accommodate a shank of large diameter; but the thread-engaging pawls are adapted to be inclined more or less with relation to the nut and thus automatically adjust themselves to shanks of various diameters.

Of the accompanying drawings which illustrate one form in which the invention may be embodied: Figure 1 represents an end elevation showing the nut applied to a threaded shank. Fig. 2 represents a transverse section through the nut, the shank being shown in side elevation. Fig. 3 represents a section, similar to Fig. 2, of the left-hand half of the nut, showing the parts in normal position. Fig. 4 represents a perspective view of the body of the nut, the attachable elements being omitted.

The same reference characters indicate the same parts wherever they occur.

The body of the nut, indicated at 10, has a relatively large central opening 11 which is not threaded. Between this opening and the sides of the nut there is an annular chamber 12, the stock between this chamber and the central opening being cut down from the top toward the bottom at a number of places to provide recesses 13 through which the thread-engaging members 14 may extend radially. The provision of the notches 13 leaves the intervening stock in the form of segmental flanges 15, the function of these flanges being to space the thread-engaging members 14 one from another and otherwise hold them in place.

One of the thread-engaging members is shown by Fig. 5. It is provided with a head 16 at its outer end and with a chisel-shaped point 7 at its inner end. In this embodiment of the invention there are six of these thread-engaging members; but more or less than this number may be used, if desired, provided there are at least three and provided they are spaced nearly equally. The members 14 are placed so that their heads 16, which are segmental, occupy the chamber 12 and so that their bodies extend inwardly through the notches 13. The members 14 are normally seated upon a flange 17 at the bottom of the nut, and they are normally pressed against this flange by an annular spring follower 18 which occupies the chamber 12. A helical spring 19, disposed in the chamber, is compressed between the follower 18 and the retaining ring 20, the retaining ring being secured by any suitable means in the chamber 12 near the upper end of the nut. As shown by the drawings, the nut is formed with a seat or shoulder 21 upon which the retaining ring rests, and the upper end of the nut is swaged as at 22 to lock the retaining ring on its seat. The follower 18 fits loosely in the chamber and is adapted to move up and down in the chamber and to tilt to a limited extent without binding.

In applying the nut to a threaded shank it is not necessary to rotate it until the bottom of the nut has been seated against the element which it is supposed to engage. The thread-engaging members 14, being adapted to assume various angles, as shown by Fig. 2, are adapted to slip over the male threads 23 of a shank 24 in the same manner as a pawl is adapted to slip over ratchet teeth, and thus the nut is adapted to be moved axially to its seat without rotative movement. When its axial movement is arrested, some or all of the members 14, hereinafter termed pawls, drop into the grooves between the threads as shown at the left of Fig. 2. Assuming that the nut has at least three pawls, three of them will engage the shank at the base of the threads, the nut being adapted to tilt and to move laterally instead of being compelled to stand squarely and concentrically with relation to the axis of the shank. All the pawls other than the three which engage the shank as shown at the left of Fig. 2, will rest against the thread somewhat as shown at the right of Fig. 2. The nut may be tightened by rotative movement after it has been moved as far as possible on to the shank by mere axial movement. The rotative movement will cause the inner ends of the pawls to follow the grooves between the threads 23, and the pawls will thus be forced toward their normal transverse position, their movement with relation to each other being similar to toggle members. As their heads abut against the annular surface 25 of the nut, their inner ends will approach the center as they approach their normal transverse position. The points of the pawls will therefore be forced more and more tightly into the shank between the threads so that they will bind and possibly cut into the shank if sufficient rotative pressure is applied.

The pawls will act in the manner described, regardless of the pitch of the thread and regardless of whether the thread is of right or left hand lead. Shanks of various diameters, within certain limits, will be grasped by the pawls in the manner explained, the angular variation of the pawls automatically compensating for various diameters.

The nut is not intended to be used when an ordinary nut having the desired thread is obtainable, but it is intended to be used only in case of emergency until a plain nut of the desired size can be obtained. It frequently happens that a nut will become detached and lost from an automobile traveling over the road. So many automobiles are provided with parts which have special threads that it would be inconvenient, if not impossible, to carry a supply of nuts for every thread. Three or four nuts of the construction just described and of graduated size would be sufficient for almost every male thread on an automobile, and it would not be necessary to carry a large assortment of nuts or to go to a repair shop when a nut is loose, provided one of these adjustable nuts is available. No additional locking device is necessary to retain the nut on the shank, provided the nut is turned up with sufficient force to cause the points of the pawls to cut into the threaded shank.

As shown by Figs. 2 and 3, the body 10 of the nut is formed with an annular shoulder 26 which overlaps the heads of the pawls. This shoulder renders the pawls incapable of being inclined in the opposite direction sufficiently to permit the nut to be placed upon a shank in the reverse position. In other words, if the nut were inverted relatively to the shank the pawls would not slip over the shank, because they would not be able to assume the inclined position which such slipping requires. It is therefore impossible to apply the nut in any way other than that intended. The pawls are preferably made of steel and hardened, in order that they may cut into the shank sufficiently to prevent accidental unscrewing.

Having thus explained the nature of my said invention and described a way of constructing and using the same, although without attempting to set forth all the forms in which it may be made or all the modes of its use, what I claim is:

1. A device for coacting with a threaded member, said device comprising a plurality of radially disposed pawls, a holder therefor, the free ends of said pawls being adapted to engage the threads of said member and enter the grooves between the same, and resilient means carried by said holder and acting upon said pawls to press the free ends against the threads.

2. A device for coacting with a threaded member, said device comprising a plurality of radially disposed pawls, a holder therefor, the free ends of said pawls being adapted to engage the threaded member and enter the grooves between the threads thereof, said pawls being capable of swinging independently of each other so as to coact with threads of various diameters, and resilient means acting upon said pawls to press their free ends against the threaded member.

3. A device for coacting with a threaded member, said device comprising a plurality of radially disposed pawls, a holder therefor, said holder having an annular recess and segmental portions for spacing the pawls apart from each other, said pawls having heads loosely disposed in said recess whereby the pawls are capable of swinging independently of each other; a helical spring loosely disposed in said recess and adapted to act upon all of said pawls, and means for holding said spring compressed whereby the free ends of said pawls are pressed against the threaded member.

4. A device for coacting with a threaded member, said device comprising a plurality of radially disposed pawls, a holder therefor, the free ends of said pawls being adapted to engage the threads of said member and enter the grooves between the same, and resilient means carried by said holder and for pressing the pawls all in one direction, said holder having means for limiting the movement of the pawls in said direction whereby said pawls are rendered incapable of slipping in one direction over a thread.

In testimony whereof I have affixed my signature, in presence of two witnesses.

EDGAR L. MARSTON.

Witnesses:
W. P. ABELL,
P. W. PEZZETTI.